(12) United States Patent
Fan et al.

(10) Patent No.: US 7,680,818 B1
(45) Date of Patent: Mar. 16, 2010

(54) ANALYZING THE DEPENDENCIES BETWEEN OBJECTS IN A SYSTEM

(75) Inventors: Zili Fan, Santa Clara, CA (US); Adrian Graham Scott, San Mateo, CA (US); Winnie Tak Yu Wan, Menlo Park, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1407 days.

(21) Appl. No.: 10/325,784

(22) Filed: Dec. 18, 2002

(51) Int. Cl.
*G06F 7/00* (2006.01)
*G06F 17/00* (2006.01)

(52) U.S. Cl. .................. 707/103 R; 707/100; 707/101; 707/10

(58) Field of Classification Search .................. 707/3, 707/8, 100–104.1, 10; 717/148; 715/513, 715/530; 705/39
See application file for complete search history.

(56) References Cited

U.S. PATENT DOCUMENTS

| | | | | | |
|---|---|---|---|---|---|
| 5,329,626 | A | * | 7/1994 | Klein et al. | 709/248 |
| 5,423,027 | A | * | 6/1995 | Jackson | 714/38 |
| 5,574,898 | A | * | 11/1996 | Leblang et al. | 707/1 |
| 5,615,333 | A | * | 3/1997 | Juettner et al. | 714/38 |
| 5,842,022 | A | * | 11/1998 | Nakahira et al. | 717/160 |
| 5,852,818 | A | * | 12/1998 | Guay et al. | 707/1 |
| 6,094,528 | A | * | 7/2000 | Jordan | 717/115 |
| 6,151,608 | A | * | 11/2000 | Abrams | 707/100 |
| 6,154,849 | A | * | 11/2000 | Xia | 714/4 |
| 6,263,341 | B1 | * | 7/2001 | Smiley | 707/102 |
| 6,408,262 | B1 | * | 6/2002 | Leerberg et al. | 703/2 |
| 6,493,720 | B1 | * | 12/2002 | Chu et al. | 707/104.1 |
| 6,598,058 | B2 | * | 7/2003 | Bird et al. | 707/201 |
| 6,604,104 | B1 | * | 8/2003 | Smith | 707/10 |
| 6,604,110 | B1 | * | 8/2003 | Savage et al. | 707/102 |
| 6,701,345 | B1 | * | 3/2004 | Carley et al. | 709/205 |
| 6,704,723 | B1 | * | 3/2004 | Alavi et al. | 707/3 |
| 6,714,943 | B1 | * | 3/2004 | Ganesh et al. | 707/104.1 |
| 6,725,452 | B1 | * | 4/2004 | Te'eni et al. | 717/168 |

(Continued)

OTHER PUBLICATIONS

"Information end-to-end Business Intelligence with BusinessObjects data Integrator"—BusinessObjects Enterprise 6 (pp. 1-3).*

(Continued)

*Primary Examiner*—Jean B Fleurantin
*Assistant Examiner*—Anh Ly
(74) *Attorney, Agent, or Firm*—Hickman Palermo Truong & Becker LLP; Christian A. Nicholes

(57) ABSTRACT

A method for determining the dependencies between objects in a system is provided. Determining the dependencies between objects involves analyzing data about the objects and applying rules to the data about the objects. According to one embodiment, a first set of dependencies between a plurality of objects may be based on data in a set of sources and dependency rules, whereas a second set of dependencies between the plurality of objects may be based on data from a different set of sources but the same dependency rules. According to another embodiment, a first set of dependencies between a plurality of objects may be based on data in a set of sources and dependency rules, whereas a second set of dependencies between the plurality of objects is based on data from the same set of sources but different dependency rules.

19 Claims, 5 Drawing Sheets

U.S. PATENT DOCUMENTS

| | | | |
|---|---|---|---|
| 6,728,719 B1* | 4/2004 | Ganesh et al. | 707/100 |
| 6,741,997 B1* | 5/2004 | Liu et al. | 707/102 |
| 6,772,137 B1* | 8/2004 | Hurwood et al. | 707/2 |
| 6,804,672 B1* | 10/2004 | Klein et al. | 707/8 |
| 6,859,798 B1* | 2/2005 | Bedell et al. | 706/45 |
| 6,871,321 B2* | 3/2005 | Wakayama | 715/234 |
| 6,983,449 B2* | 1/2006 | Newman | 717/121 |
| 6,993,746 B2* | 1/2006 | Hue | 717/121 |
| 7,010,529 B2* | 3/2006 | Klein et al. | 707/8 |
| 7,080,088 B1* | 7/2006 | Lau | 707/101 |
| 7,140,013 B2* | 11/2006 | Te'eni et al. | 717/173 |
| 7,188,332 B2* | 3/2007 | Charisius et al. | 717/104 |
| 7,251,776 B2* | 7/2007 | Handsaker et al. | 715/503 |
| 7,290,007 B2* | 10/2007 | Farber et al. | 707/103 R |
| 7,409,634 B2* | 8/2008 | Davis et al. | 715/234 |
| 7,409,679 B2* | 8/2008 | Chedgey et al. | 717/144 |
| 7,478,385 B2* | 1/2009 | Sierer et al. | 717/174 |
| 7,490,317 B1* | 2/2009 | Hahn et al. | 717/121 |
| 2001/0027458 A1* | 10/2001 | Wakayama | 707/501.1 |
| 2001/0034733 A1* | 10/2001 | Prompt et al. | 707/102 |
| 2001/0049695 A1* | 12/2001 | Chi et al. | 707/201 |
| 2002/0049749 A1* | 4/2002 | Helgeson et al. | 707/3 |
| 2002/0087516 A1* | 7/2002 | Cras et al. | 707/2 |
| 2002/0087734 A1* | 7/2002 | Marshall et al. | 709/310 |
| 2002/0091579 A1* | 7/2002 | Yehia et al. | 705/26 |
| 2002/0091614 A1* | 7/2002 | Yehia et al. | 705/37 |
| 2002/0133516 A1* | 9/2002 | Davis et al. | 707/513 |
| 2002/0144233 A1* | 10/2002 | Chong et al. | 717/105 |
| 2002/0158918 A1* | 10/2002 | Feibush et al. | 345/853 |
| 2002/0198985 A1* | 12/2002 | Fraenkel et al. | 709/224 |
| 2003/0004774 A1* | 1/2003 | Greene et al. | 705/8 |
| 2003/0065405 A1* | 4/2003 | Zhong | 700/1 |
| 2003/0067481 A1* | 4/2003 | Chedgey et al. | 345/738 |
| 2003/0084053 A1* | 5/2003 | Govrin et al. | 707/100 |
| 2003/0110253 A1* | 6/2003 | Anuszczyk et al. | 709/224 |
| 2003/0120593 A1* | 6/2003 | Bansal et al. | 705/39 |
| 2003/0120665 A1* | 6/2003 | Fox et al. | 707/100 |
| 2003/0200356 A1* | 10/2003 | Hue | 709/322 |
| 2003/0208493 A1* | 11/2003 | Hall et al. | 707/100 |
| 2003/0217033 A1* | 11/2003 | Sandler et al. | 707/1 |
| 2004/0001103 A1* | 1/2004 | Fliess et al. | 345/810 |
| 2004/0015946 A1* | 1/2004 | Te'eni et al. | 717/169 |
| 2004/0024627 A1* | 2/2004 | Keener | 705/7 |
| 2004/0034848 A1* | 2/2004 | Moore et al. | 717/117 |
| 2004/0046785 A1* | 3/2004 | Keller | 345/734 |
| 2004/0049372 A1* | 3/2004 | Keller | 703/22 |
| 2004/0064456 A1* | 4/2004 | Fong et al. | 707/100 |
| 2004/0083448 A1* | 4/2004 | Schulz et al. | 717/101 |
| 2004/0181538 A1* | 9/2004 | Lo et al. | 707/100 |
| 2004/0205726 A1* | 10/2004 | Chedgey et al. | 717/125 |
| 2004/0210445 A1* | 10/2004 | Veronese et al. | 705/1 |
| 2005/0015360 A1* | 1/2005 | Cras et al. | 707/2 |
| 2005/0015377 A1* | 1/2005 | Wan | 707/10 |
| 2005/0021713 A1* | 1/2005 | Dugan et al. | 709/223 |
| 2005/0028080 A1* | 2/2005 | Challenger et al. | 715/501.1 |
| 2005/0144619 A1* | 6/2005 | Newman | 717/177 |
| 2005/0240621 A1* | 10/2005 | Robertson et al. | 707/102 |
| 2005/0289168 A1* | 12/2005 | Green et al. | 707/101 |
| 2005/0289169 A1* | 12/2005 | Adya et al. | 707/101 |
| 2006/0056706 A1* | 3/2006 | Marcellin et al. | 382/232 |
| 2006/0059253 A1* | 3/2006 | Goodman et al. | 709/223 |
| 2006/0294459 A1* | 12/2006 | Davis et al. | 715/513 |

OTHER PUBLICATIONS

"Object-Oriented Database Support for Software Environments"—Scott E. Hudson & Roger King—ACM 1987 (pp. 491-503).*

"Discovering Attribute Relationships, Dependencies and Rules by Using Rough Sets"—Wojciech Ziarko and Ning Shan—IEEE 1995 (proceedings of the 28th Annual Hawaii International Conference on System Sciences—(HICSS) 1995) (pp. 293-299).*

"A Knowledge-Based Approach to regression testing"—Taewoong Jeon & Von Mayrhauser, A. —Software Engineering Conference, 1994 Proceedings, 1994 First Asia-Pacific, Dec. 7-9, 1994 Tokyo Japan, (pp. 144-153).*

"Impact Analysis in the software change process: A year 2000 Perspective"—Shawn A. Bohner—1996 IEEE (pp. 42-51).*

"Software Change Impacts: An Evolving perspective"—Shawn A. Bohner—2002 IEEE (pp. 263-271).*

Bouma et al.—"Querying Dependency Treebanks in XML"—Proceedings of the $3^{rd}$ International conference, Citeseer—2002 (pp. 1-6).*

Norman M. Fraser—"Prolegomena to a formal theroy of dependency grammar"—UCL working papers in Linguistics, 1990—phon.uci.ac.uk (pp. 298-319).*

John C. Grundy and John G. Hosking—"Constructing integrated software delevelopment environments with dependency graphs"—working paper94/4, department/computer science—1998 (ACM—TOSEM) (pp. 1-17).*

* cited by examiner

ANALYZING THE DEPENDENCIES BETWEEN OBJECTS IN A SYSTEM

FIELD OF THE INVENTION

The present invention relates to using computers to analyze information and, more specifically, to analyzing the dependencies between objects in a system.

BACKGROUND OF THE INVENTION

Frequently, there is a need to understand the relationships between various objects in order to assess the effect that a change associated with one object has on other objects within a system. When a change associated with a first object affects a second object, there is a "dependency" between the objects. Specifically, the second object is the to "depend on" the first object.

What it specifically means for an object to "depend on" another object is determined by the "dependency rules" that are established for the objects in question. For example, in the context of a company, one may define a dependency rule that a first person depends on a second person if the first person is managed by the second person. In the context of software deployment, one may define a dependency rule that a first software module depends on a second software module if the first software module has to be installed before the second software module. In the context of a database, one may define a dependency rule that a first database object depends on a second database object if the definition of the first database object refers to the second database object. In the context of a family, one may define a dependency rule that a first family member depends on a second family member if the first family member is a descendant of the second family member. In the context of a patent application, one may define a dependency rule that a first claim depends on a second claim if the first claim refers to the second claim and incorporates all of the limitations of the second claim.

The foregoing examples illustrate simply dependency rules for several contexts. As is evident by the examples, the "objects" that are subject of the dependency rules vary from context to context. In fact, there is virtually no limit to the type of objects for which dependency rules may be defined. Further, there is no limit to the type and complexity of the dependency rules themselves.

When objects are represented within a computer system, the computer system may be programmed to determine the dependencies between the objects based on the appropriate dependency rules. For example, assume that a database contains a table that includes information about all of the employees of a company. Assume that each row of the table corresponds to an employee, and that a particular column of the table is used to indicate the managers of the employees. Finally, assume that the dependency rule established for the company is that a first employee depends on a second employee if the second employee manages the first employee. In this scenario, a program may be written to determine the dependency relationships between the employees based on (1) the dependency rule, (2) the employee associated with each row, and (3) the manager identified in the column of each row.

In the preceding examples, the dependencies existed between same-type objects. However, dependencies may also exist between different types of objects. For example, a software module that processes certain types of records may "depend on" the format of those records. In this example, the format of a record is a different type of object than a software module, yet the software module depends on the format of the record.

In most cases, the dependency rules establish a transitive relationship. Thus, if A depends on B, and B depends on C, then A depends on C. For example, certain objects in a data warehouse may affect other objects in the data warehouse, which in turn may affect yet other objects in the data warehouse. For example, the objects in the data warehouse may be tables containing source data, code for processing the tables containing the source data, and staging tables. A change in the format of the tables containing the source data may require an update to the code that processes the tables containing the source data. Thus, the code depends on the source data tables. In turn, an update to the code that processes the tables containing the source data may affect other objects in the data warehouse, such as staging tables. Thus, the staging tables depend on the code. Because the staging tables depend on the code, and the code depends on the source data tables, the staging tables (indirectly) depend on the source data tables.

In many situations, it is critical to know the dependencies between objects. For example, in looking at a report that was generated by a business intelligence analysis tool, a person may see what appears to be an error in the amount of money charged to a particular client for a service rendered by a particular business. The source of the error may lie in any of the various objects involved in generating the erroneous number. Unfortunately, the list of objects involved in generating that number may be long, and the dependencies between them may be complex. For example, the business intelligence analysis tool may access a database comprising objects, such as database tables with data describing businesses and their respective clients, as well as transitional objects. The transitional objects may be programs that perform operations on the database tables. Determining whether there is an error entails not only examining the tables that contain the client's data and the table containing the business' data, but may also entail examining the transitional objects between the two tables.

In the foregoing example, the dependency information is important to determine the "lineage" of the erroneous number. A "lineage analysis" involves identifying the set of objects on which an object depends. In other situations, it is important to know which objects depend on a particular object. For example, an "impact analysis" involves identifying which objects will be impacted by a change to a particular object.

Both lineage analysis and impact analysis are painstaking processes if done manually, and require intimate knowledge of the systems and objects involved in the analysis. Tools can be created to help in this analysis. However, the nature of the objects and the dependencies between the objects vary widely. For example, the objects may comprise data describing parties involved in business relationships, people in families, or even geological formations. Further, the nature of the dependencies between these various types of objects vary. Therefore, many different tools would be needed to address all of the types of problems for all of the types of objects and the dependencies between the objects.

As is evident by the foregoing examples, there is a need to provide a scalable, flexible, and expandable way of analyzing the dependencies between various types of objects, from various types of systems, with various types of dependency relationships, without a proliferation of dependency-analysis tools.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Techniques for analyzing the dependencies between objects in a system are described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

Techniques are provided to allow users to perform lineage and impact analysis without the need for context-specific analysis tools. Specifically, techniques are provided for generating, in a common format, dependency information for virtually any type of object, from virtually any type of system, based on virtually any type of dependency rules. Because the dependency information is stored in a common format, without regard to the specific nature of the objects, system, sources and rules, analysis tools designed to handle the common format may be used to perform analyses for a wide variety of contexts. Thus, the need for specially-designed analysis tools is avoided.

Structural Overview

Figure 1:
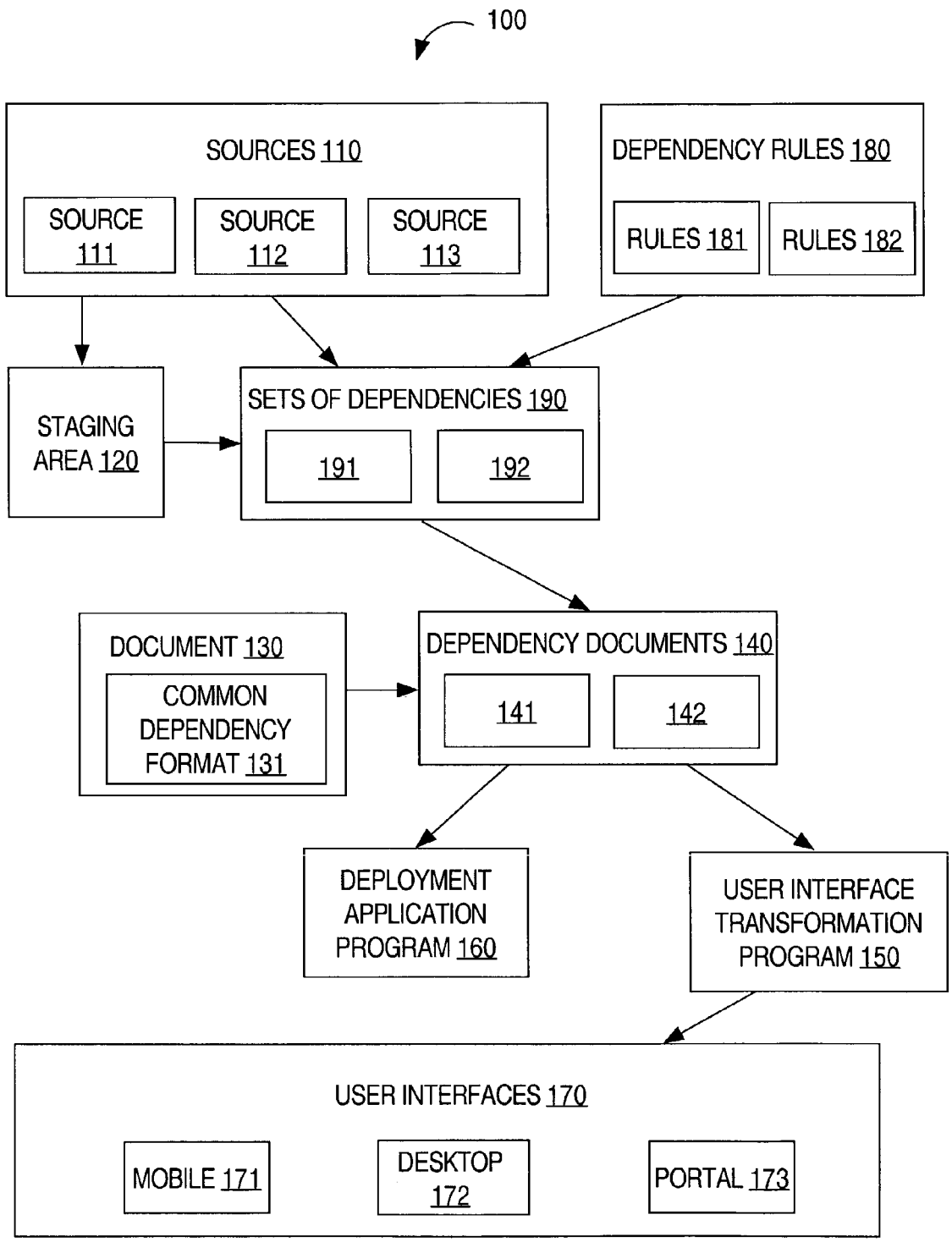
FIG. 1 is a block diagram that illustrates a system for analyzing the dependencies between objects.

FIG. 1 is a block diagram that illustrates a system 100 for analyzing the dependencies between objects, according to one embodiment. In system 100, the tasks of determining the dependencies between objects, and generating dependency information that represents the dependencies, is separated from the task of displaying, analyzing and using the dependency information.

The tasks of determining dependencies and generating dependency information may involve, for example, gathering information about many different types of objects from many sources 110. Different sets of dependencies rules 180 may be applied to that data to establish multiple sets of dependency information 190. Dependency information 190 generally represents a single repository used to store data about multiple, potentially unrelated sets of dependency information. For example, dependency information 191 may indicate the "managed by" dependencies between employees of a company, while dependency information 192 may represent the "install before" dependencies between the various components of a software application.

The various sets of dependency information may have no relation to one another. However, from that dependency information, dependency documents 140 that conform to a common dependency format 131 are generated. The same common dependency format 131 is used regardless of the source, the nature of the objects, or the dependency rules that were used to determine the dependencies.

Because the dependency documents 140 are all structured in conformity with the common dependency format 131, any program that supports receiving dependency information in that format is able to handle dependency information from any of sources 110. In the system 100 illustrated in FIG. 1, the various types of programs that support the common dependency format are shown. Specifically, system 100 includes a deployment application program 160 and a user interface transformation program 150 that are designed to read dependency data that is formatted according to the common dependency format 130. The output from the interface transformation program 150 may be displayed on a wide variety of user interfaces 170, including a mobile user interface 171, a desktop user interface 172 and a portal user interface 173.

Dependencies

The nature of objects, between which dependencies exist, will vary from context to context. For example, in one context, the objects between which dependencies exist may include a field, or a column in a database. Further, in another context, the object may be a program that operates on other objects or performs some transformation on objects. For example, an object could be a join on two database tables or the results of the join. Further, the objects could be data in a data warehouse, as will be described in more detail.

In addition, what it means for one object to "depend on" another object will vary from context to context. For example, the dependencies between a parent and a child are different from the dependencies between employers and employees. Similarly, the dependencies between patent claims are different from the dependencies involved in determining the order in which to deploy software.

Sources

Sources 110 generally represent sources of information about objects between which dependencies exist. For example, source 111 may be a database that contains information about database objects. The dependency relationship between the database objects may be defined in rules 181 to be that a first database object depends on a second database object if modifying the definition of the second database object may affect the definition of the first database object. In this example, the database would not only include the objects themselves, but would include information about the objects, such as the definition of the objects, that could be used to determine the dependencies between the database objects.

As another example, source 112 may be an employee table that contains information about employees of a company. The dependency relationship between the employees may be defined in rules 182 to be that a first employee depends on a second employee if the second employee manages the first employee. In this example, table may include a "manager" column that could be used to determine the dependencies between the employees.

According to one embodiment, the sources 110 may comprise data that describes objects from various domains, such as data warehousing, business intelligence, CRM, ERP, such as Oracle Finance, and OLAP.

Dependency Rules

As mentioned above, dependency rules define what it means for an object to depend on another object. Thus, the dependency rules must be used in conjunction with the information about the object to determine the dependencies between the objects. Thus, a completely different set of dependencies may result from applying two different sets of dependency rules to the same objects. For example, for a given set of people, the dependency rule "A depends on B if B is the parent of A" would produce a completely different set of dependencies than the rule "A depends on B if A is managed by B".

There are many different aspects that affect dependency rules. These aspects include, but are not limited to, the type of objects being analyzed, whether an object is being affected by another object or is affecting other objects, whether data associated with the objects is being analyzed, and whether the structure associated with the object is being analyzed.

The dependency rules established for a given domain will vary based on a variety of factors, including the goal of the analysis being performed. For example, the dependency rules for analyzing the dependencies between patent claims is different from the dependency rules for analyzing the dependencies involved in determining the order in which to deploy software.

Staging Area

The information about objects, to which dependency rules are applied to generate dependency information, may be accessed from the original sources 110 of that information. Alternatively, the information may be first gathered from the sources 110 into a staging area. The dependency rules may then be applied to the information in the staging area 120 to generate the dependency information. For example, data describing a particular set of inter-dependent objects may be scattered across many sources. The staging area 120 may be a table used to gather the data describing the particular plurality of objects.

According to one embodiment, the staging area may be a materialized view (MV). Typically, a MV comprises data from base tables of a database. An MV can be set up to automatically stay in sync with the base tables used by the queries in the MV. Thus, the data captured by the MV for other tables may be used to view data that is scattered across many database tables.

A Common Dependency Format

As already stated, data that reflects sets of dependencies 190 is stored in dependency documents 140 that conform to a common dependency format 131. According to one embodiment, the common dependency format 131 is a hierarchical format, and the data that reflects sets of dependencies is stored in dependency documents 140 according to the hierarchical format.

The following is an example of how dependency information related to an "Object A" may be represented in a hierarchical format:

10 Object A 15 dependency {

20 object B 25 dependency {

30 object E

35}

40 object C 45 object D

50 }

Each line in the above example is depicted with a reference number to the left for the purposes of facilitating the following explanation. In this example, line 10 includes the object name, Object A, for a particular element. According to one embodiment, begin and end tags delineate the dependency information that is associated with the object. In this example, a "{" is a begin tag and a "}" is an end tag. Information between lines 15 and 50 is the dependency information associated with object A and the information between lines 25 and 35 is the dependency information associated with object B.

According to one embodiment, tags are used to describe which objects depend (referred to hereinafter as "dependent objects") on other objects. For example, the "dependency" tag at line 15 may indicate that the elements between lines 15 and 50 represent objects that depend on object A. As depicted in the above example, objects B, C, and D depend on object A. Object E depends on Object B.

The "dependency" tag is only one example of a tag that may be used for describing the relationship between elements. According to one embodiment, a "parent" tag may be used to indicate that a particular element represents an object that is depended on by another object (referred to hereinafter as a "parent object").

Using an XML Schema to Define the Common Format

According to one embodiment, dependency documents 140 are Extensible Markup Language (XML) documents that conform to a particular XML schema that is specifically designed for representing dependencies between objects. Appendix A is an example of such an XML schema.

XML allows for the creation of customized tags enabling the definition of data. An XML schema can be used to define the customized tags to delineate elements in XML documents. For example, the XML schema depicted in Appendix A defines tags for delineating, among other things, elements that correspond to objects in general, elements that correspond specifically to parent objects and elements that correspond specifically to dependent objects. Further, the XML schema depicted in appendix A defines an element that corresponds to the name of objects, as will be described in more detail.

Recursive Dependencies

At times, the dependency relationship between objects is recursive in nature. For example, object A may depend on an object B, which may depend on an object C, which depends back on object A. According to one embodiment, the common dependency format provides a mechanism to avoid repeating the data associated with object A the subsequent times that object A appears in the common dependency format.

For example, the XML schema depicted in appendix A provides an attribute name "complete", which is used for this mechanism. The attribute name "complete" may be set to a boolean value of "yes" or "no" indicating whether this is the first time an element describing an object's dependencies appears in an XML document or a subsequent occurrence of an element describing the same object's dependencies. The first time an element describing an object's dependencies appears in an XML document, the object's dependency information is fully described and "complete" is set to "yes". The subsequent times an element describing the same object appears in the XML document, "complete" is set to "no" indicating that the subsequent appearance should obtain dependency information about the object from the first appearance.

Example Dependency Documents

This common dependency format may be used for all problem areas and for all domains, which relieves implementers from the burden of deriving customized tools for each domain. Because the dependency information is stored in the common format, a particular analysis tool only needs to be generated once and then may used for analyzing dependency relationships between objects from any of the domains.

Appendix B illustrates a dependency document that may be used to perform impact analysis, according to one embodiment. The dependency document, as illustrated in appendix B, is an XML document that conforms to the XML schema illustrated in appendix A. Reference numbers, which are used to indicate the XML statements discussed herein, are in the right margin of appendix B. At reference number 30a, the "LIAType='impact'" tag indicates that this XML document is for impact analysis.

As depicted in appendix B, <OBJECT> and </OBJECT> are respectively begin and end tags used for delineating elements which comprise dependency information associated with objects. <DEPENDENCY> and </DEPENDENCY> are respectively begin and end tags used for delineating elements which comprise dependency information associated with dependent objects. <PARENT> and </PARENT>> are respectively begin and end tags used for delineating elements which comprise dependency information associated with parents objects. <NAME> and </NAME> are respectively begin and end tags used for delineating the name of objects in general.

At reference numbers 34a and 35a, appendix B depicts the names of a dependent objects "Products" and "Expr". At reference number 33a, appendix B depicts the name of the object, "Union_1", that "Product" and "Expr" depend on. At reference number 33b, appendix B depicts the name, "Map_products" of the parent object of "Union_1".

As already stated, at times the relationship between objects is recursive in nature. The attribute name "complete" is one example of a mechanism to avoid repeating dependency information for objects. For example, the first occurrence of dependency information for the "Products" object in the XML document is depicted at reference number 34a in appendix B. The second occurrence of dependency information for the "Products" object is depicted at reference number 38a in appendix B. A "complete=yes" tag, at reference 37c, is associated with the first occurrence and a "complete=no" tag, at reference 38c, is associated with the second occurrence.

Thus, the second occurrence of "Products" may obtain dependency information from the first occurrence.

In a similar manner, appendix C illustrates a dependency document for analyzing the lineage of objects, according to one embodiment. The dependency document, as illustrated in appendix C, is an XML document that also conforms to the XML schema illustrated in appendix A.

According to one embodiment, data for different sets of dependencies are stored in different dependency documents. For example, the data in the dependency document illustrated in appendix B pertains to the impact analysis of a plurality of objects, whereas, the data in the dependency document illustrated in appendix C pertains to the lineage of a plurality of objects.

According to one embodiment, all sets of dependencies are stored in dependency documents that conform to a common dependency format. For example, the data in the dependency document illustrated in appendix B and the data in the dependency document illustrated in appendix C both conform to the XML schema illustrated in appendix A.

Dependency Analysis

Once the dependency information is established, how the dependency information is presented will depend on the type of analysis being performed. For example, for some purposes a user will wish to see the lineage of an object. For other purposes, a user will wish to perform impact analysis to see what other objects may be affected by a change to a particular object.

Figure 2A:
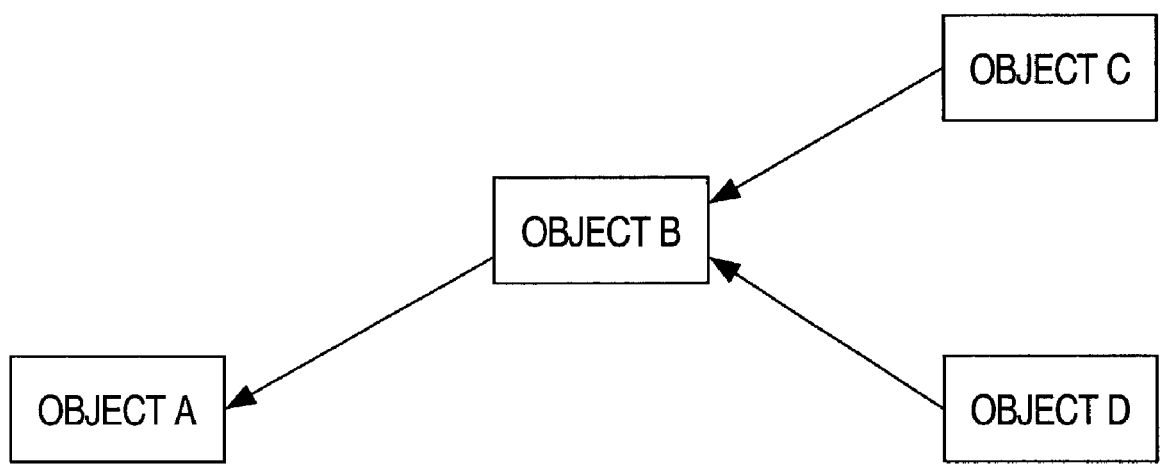
FIG. 2A is a block diagram depicting objects in an impact analysis example.
Figure 2B:
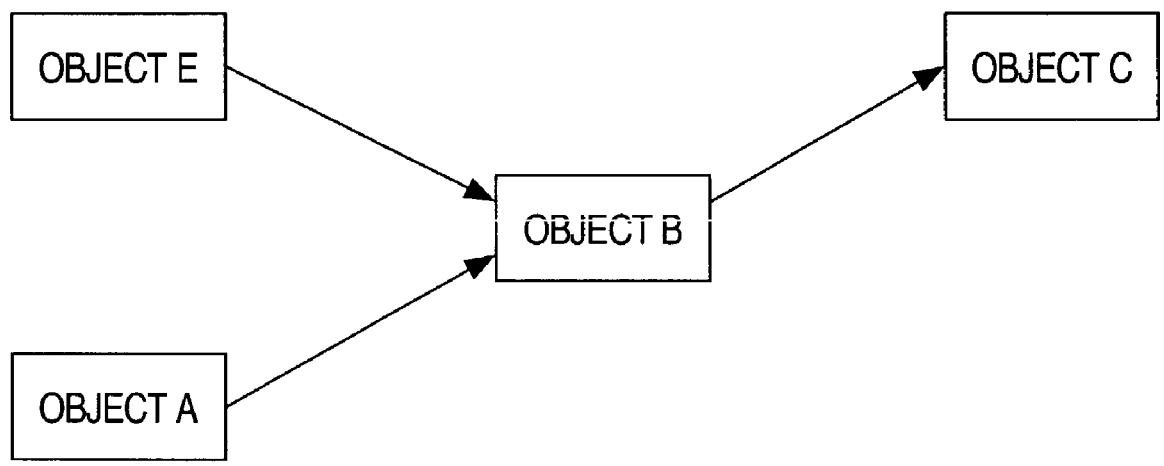
FIG. 2B is a block diagram depicting objects in a lineage example.

FIG. 2A is a block diagram depicting objects in an impact analysis example, and FIG. 2B is a block diagram depicting objects in a lineage example. Referring to FIG. 2A, object A is "affected" or "impacted" not only by object C but also by object D. For example, a modification in the data or structure of objects C or D impacts object B, which in turn impacts object A. Referring to FIG. 2B, object C is in the "lineage" of both object E and object A, thus, object C can "affect" both objects E and A. For example, if the objects depicted in FIG. 2B are Object Oriented classes, and object B is a subclass of object C, and objects E and A are subclasses of object B, then a change to object C affects not only object B but also affects objects E and A.

Both FIGS. 2A and 2B have many objects in common, yet the set of objects in the lineage and impact analysis examples is not identical. Graphing the dependencies between objects is not simply a matter of connecting all objects with all the other objects regardless of the type of relationship between the objects or the type of analysis being performed on the objects. For example, objects A, B, and C are found in both the lineage and the impact analysis examples, however, object D is only in the impact analysis example. Further, object E is only in the lineage example.

Using Dependency Documents

Dependency documents 140 may be used by any application or tool that (1) uses dependency information, and (2) supports the common dependency format. FIG. 1 illustrates various types of applications that may be use the dependency documents 140. For example, the dependency information may be used by a user interface transformation program 150, such as an XSL transformation program. Since a common dependency format is used for storing information from the sets of dependencies, the information can easily be rendered by any user interface, such as the user interface to a cell phone, a desktop computer, or a PDA.

As another example, a deployment application program 160 be designed to install software components in a sequence that is based on the dependencies between the components, where those dependencies are reflected in a dependency document 141 that conforms to the common dependency format 131.

These examples are intended to illustrate the wide range of software components that may be configured to read, as input, dependency information that conforms to the common dependency format 131. However, the use of dependency documents is not limited to the types of applications shown. Because the dependencies between different types of objects, from different sources, established by different dependency rules, can all be represented using the common dependency format 131, applications that support the common dependency format can be used in a wide range of contexts.

Generating a Visual Representation of a Set of Dependencies

A dependency analysis tool, designed to read dependency information that is represented in the common dependency format, may perform a wide variety of operations based on the dependency information. One such operation is the generation of a display that visually depicts the inter-dependent objects associated with the dependency information, as well as the dependencies between the objects.

Figure 3:
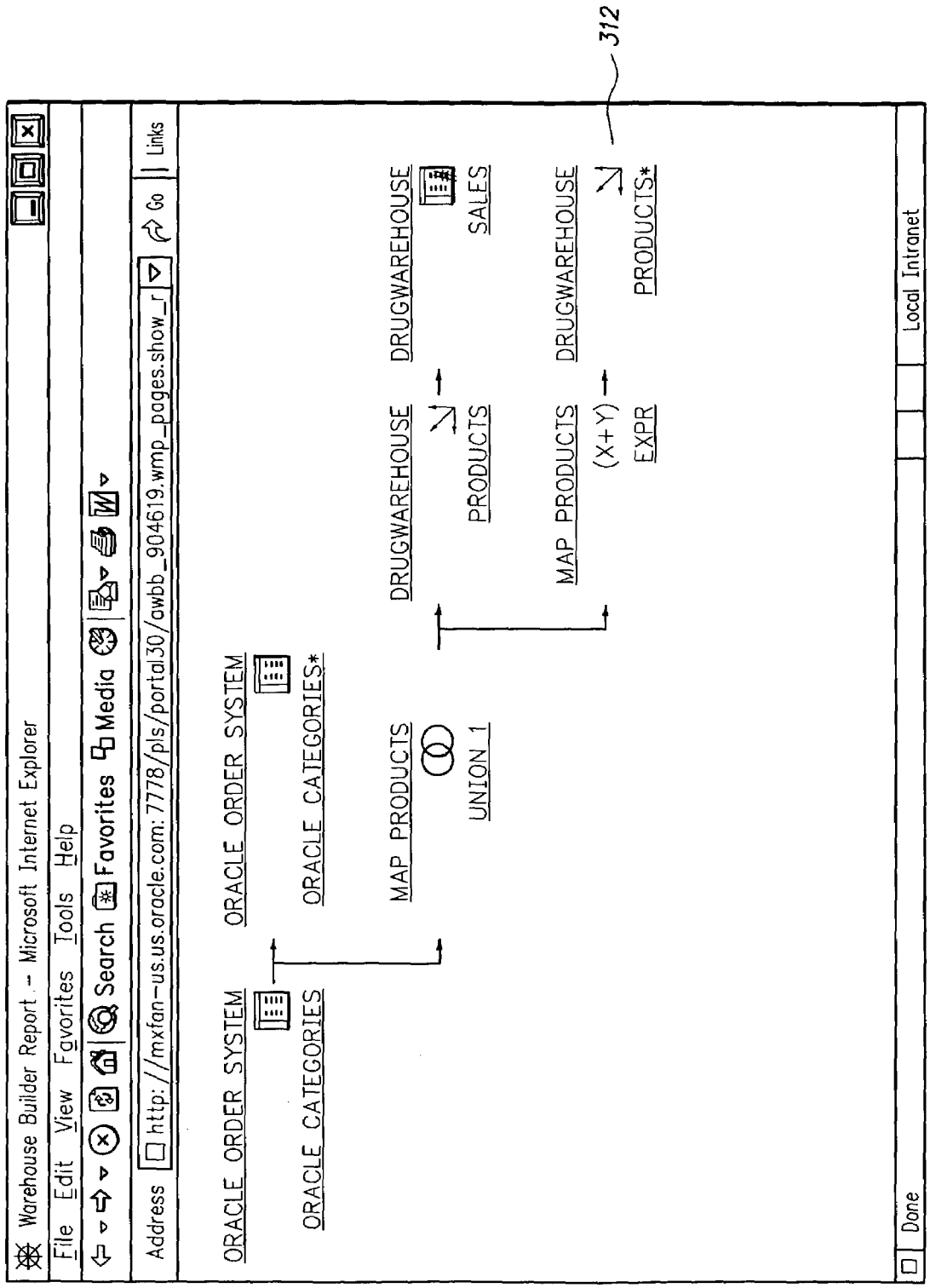
FIG. 3 is the top and the bottom halves of a screen shot depicting a visual representation of an impact analysis of objects.

FIG. 3 is the top and the bottom halves of a screen shot depicting a visual representation of the dependencies between objects, which may be used to perform an impact analysis. In this example, the screen shot is from the Warehouse Builder Browser of Oracle Warehouse Builder and depicts a visual representation of a set of dependencies between objects using Oracle Warehouse Builder.

According to one embodiment, each icon is a visual representation of an object and the arrows between the icons depict the dependencies between the objects. The sets of dependencies, which are stored in the dependency documents, are used to determine how the icons and the arrows are to be arranged on the screen shot. For example, the set of dependencies from the dependency document illustrated in appendix B is used to determine how the icons and the arrows are to be arranged on the screen shot illustrated in FIG. 3.

According to one embodiment, arrows between icons indicate the effects that objects represented by the icons have on other objects. For example, the arrows indicate the direction of impacts that objects have on each other. The object represented at the head of an arrow impacts the object represented at the tail of the arrow. For example, "Oracle Categories" impacts "Oracle Categories, and "Union 1".

According to one embodiment, the way a particular object is depicted in a user interface is different depending on whether this is the first time the particular object is depicted versus subsequent times the particular object is depicted. The first time a visual representation of a particular object appears, all the data pertaining to the relationships between the particular object and other objects is depicted. For example, there may be an arrow pointing from the visual representation of a particular object to the visual representations of objects that are impacted by the particular object.

Subsequent times the particular object is depicted, the relationships between the particular object and other objects may not appear. Further, a different icon may be used to represent the particular object to indicate that this is a subsequent appearance. For example, at reference 312, a subsequent appearance of "Products", which corresponds to "Products" at reference 38*a* in appendix B, is displayed and the relationship of the "Products" object to other objects is not repeated. According to one embodiment, the complete tag, as already described herein, may be used to determine if this is the first time the particular object is depicted or a subsequent time the particular object is depicted.

Figure 4:
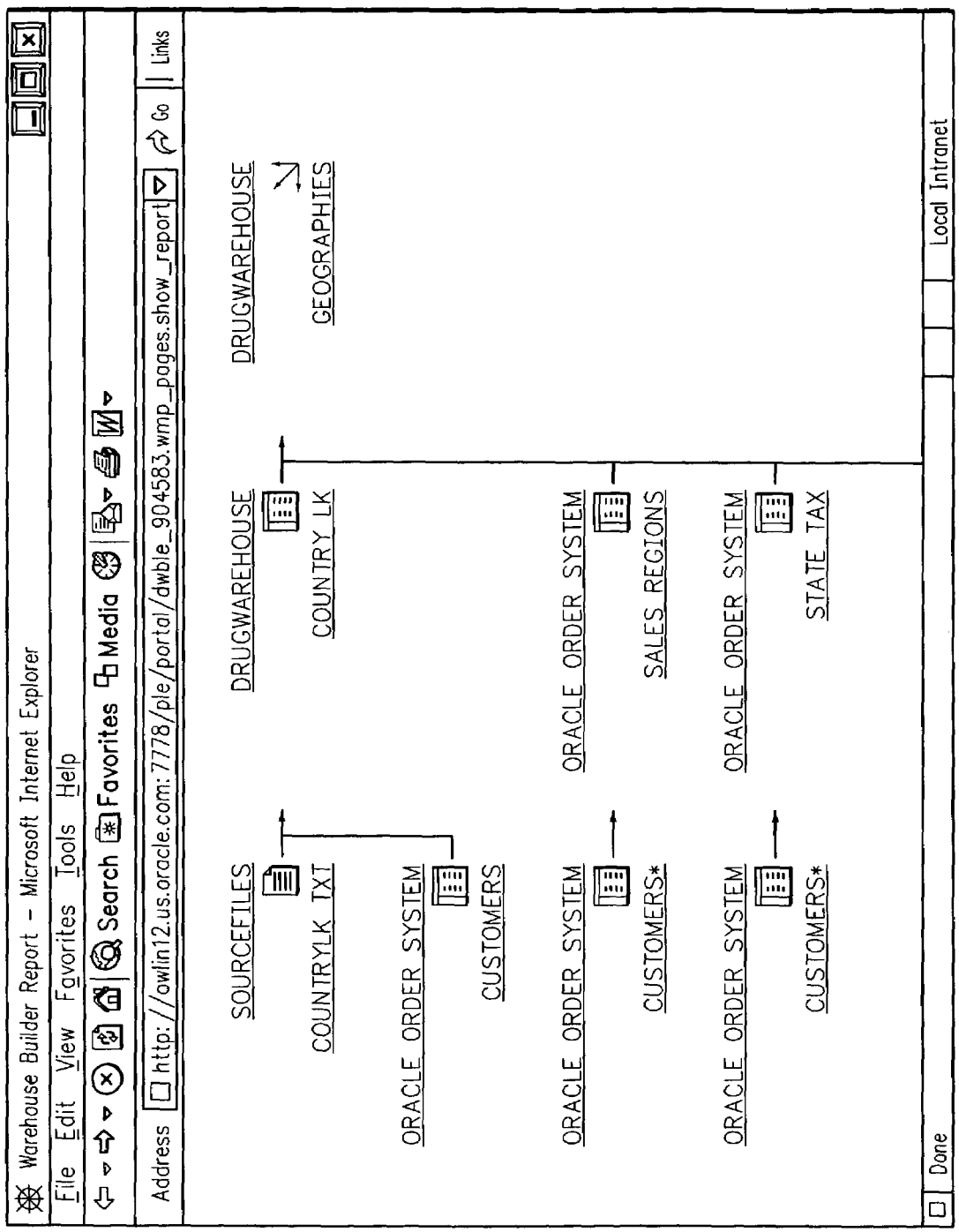
FIG. 4 is a screen shot depicting a visual representation of the lineage of objects.

In a similar manner, FIG. 4 is a screen shot depicting a visual representation of the lineage of objects. In this example, the screen shot is from the Warehouse Builder Browser of Oracle Warehouse Builder and depicts a visual representation of the lineage of objects using Oracle Warehouse Builder. The icons depicted in the screen shot of FIG. 4 represent the set of dependencies that are described in the dependency document illustrated in appendix C.

The arrows indicate the direction of the lineage. The object represented at the head of an arrow is dependent on the object represented at the tail of the arrow. For example, "Geographics" is dependent on "Country_LK", "Sales_Regions" and "State_Tax".

CONCLUSION

The architecture and processes described herein provide for analyzing dependencies between objects in a manner that, among other things, is scaleable, flexible, expandable, and reusable. For example, the common dependency format allows dependencies between objects to be displayed easily for any domain. Similarly, the common dependency format allows the user interface transformation program to display dependencies using many different user interfaces with a minimal amount of programming.

Many of the examples described herein are in the context of database systems and data warehousing. However, the techniques described herein can be used for any context where the dependencies between objects are being determined.

Hardware Overview

Figure 5:
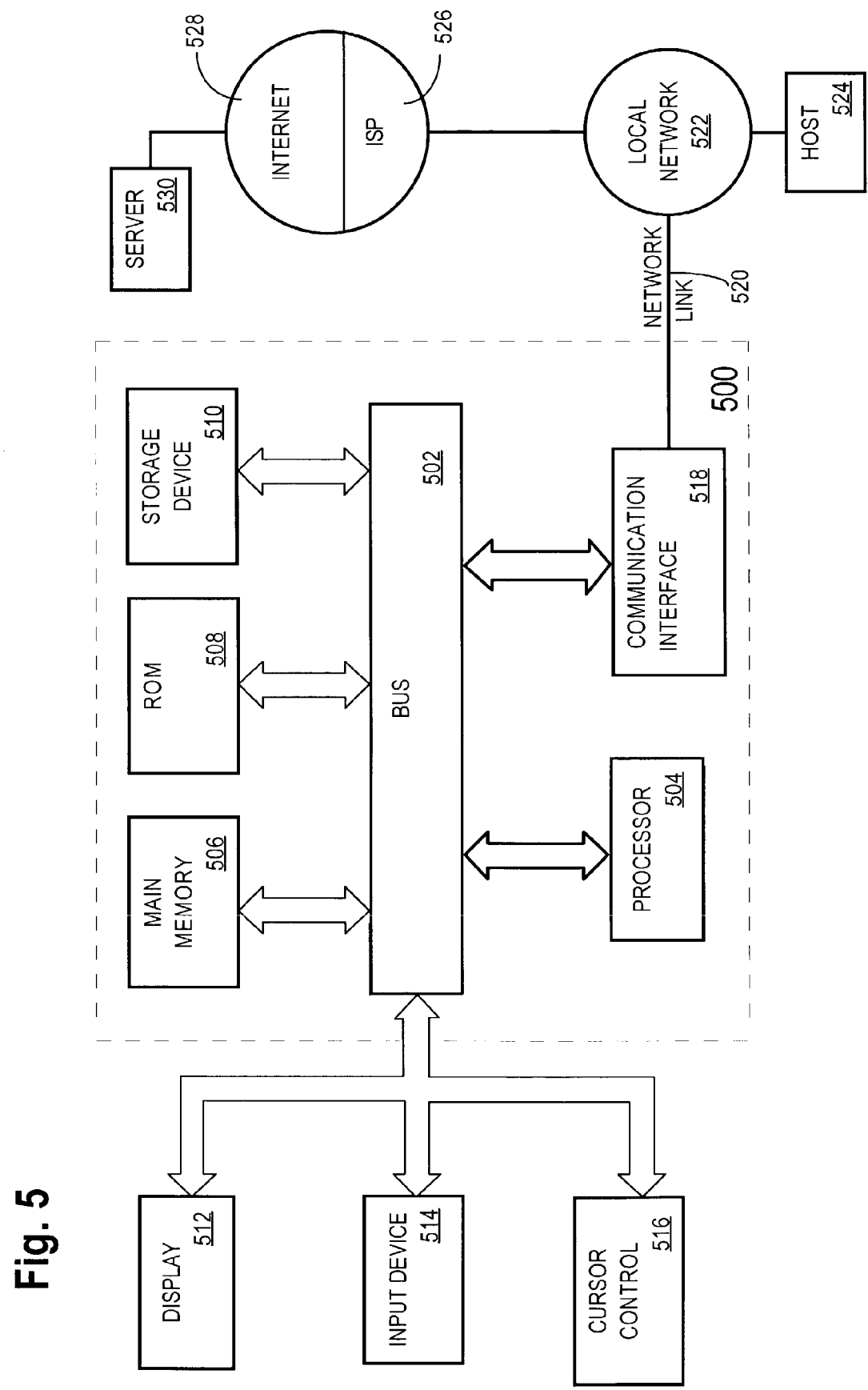
FIG. 5 is a block diagram that illustrates a computer system upon which an embodiment of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

APPENDIX A

```
<?xml version="1.0" encoding="UTF-8"?>
<xsd:schema xmlns:xsd="http://www.w3.org/2000/10/XMLSchema"
        elementFormDefault="qualified">
<!-- .................... Main Documentation ........................ -->
<xsd:annotation>
        <xsd:documentation xml:lang="en">
        Lineage and Impact Analysis Schema
        Copyright 2001 Oracle Corp. All rights reserved.
        <xsd:documentation>
</xsd:annotation>
<!-- .................... Analysis Type ............................. -->
<xsd:element name="TREE">
        <xsd:complexType>
            <xsd:sequence minOccurs="1" maxOccurs="1">
                <xsd:element name="DEPENDENCY" type=
                    "DependencyType"/>
            </xsd:sequence>
        </xsd:complexType>
            <xsd:attribute name="CreateDate" type="xsd:dateTime" use=
                "optional"/>
            <xsd:attribute name="UpdateDate" type="xsd:dateTime" use=
                "optional"/>
            <xsd:attribute name="LIAType" type="LIAType" use=
                "required"/>
</xsd element>
<!-- ................ Dependency Type ............................ -->
<xsd:complexType name="DependencyType">
        <xsd:sequence minOccurs="0" maxOccurs="unbounded">
            <xsd:element name="OBJECT" type="ObjectType"/>
```

APPENDIX A-continued

```
    </xsd:sequence>
        <!-- dependency description is for expression usage -->
        <xsd:attribute name="Description" type="xsd:string" use=
"required"/>
        <xsd:attribute name="Impact" type="ImpactType" use=
"required"/>
        <xsd:attribute name="Complete" type="xsd:boolean" use=
"required"/>
</xsd complexType>
<!-- .................. Object Reference Type .......................... -->
<xsd:complexType name="ObjectReferenceType">
    <xsd:sequence minOccurs="1" maxOccurs="1">
        <xsd:sequence minOccurs="1" maxOccurs="1">
            <xsd:element name="NAME" type="xsd:string"/>
            <xsd:element name="TYPE" type="xsd:string"/>
            <xsd:element name="ID" type="xsd:ID"/>
            <xsd:element name="DESCRIPTION" type=
            "xsd:string"/>
        </xsd:sequence>
        <xsd:sequence minOccurs="0" maxOccurs="1">
            <xsd:sequence minOccurs="0" maxOccurs="1">
                <xsd:element name="RPTLINK" type="xsd:uri-
reference"/>
            </xsd:sequence>
            <xsd:sequence minOccurs="0" maxOccurs="1">
                <xsd:element name="NAVLINK" type="xsd:uri-
reference"/>
            </xsd:sequence>
            <xsd:sequence minOccurs="0" maxOccurs="1">
                <xsd:element name="IMGLINK" type="xsd:uri-
reference"/>
            </xsd:sequence>
        </xsd:sequence>
    </xsd:sequence>
</xsd:complexType>
<!-- .................. Object Type ..................... -->
<xsd:complexType name="ObjectType">
    <complexContent>
        <extension base="ObjectReferenceType">
            <xsd:sequence minOccurs="1" maxOccurs="1">
                <xsd:sequence minOccurs="1" maxOccurs="1">
                    <xsd:element name="PARENT"
type="ParentType"/>
                </xsd:sequence>
                <xsd:sequence minOccurs="0" maxOccurs="1">
                    <xsd:element name="CONNECTORLIST"
type="ConnectorListType"/>
                </xsd:sequence>
                <xsd:sequence minOccurs="0" maxOccurs=
"unbounded">
                    <xsd:element name="DEPENDENCY"
type="DependencyType"/>
                </xsd:sequence>
            </xsd:sequence>
        </extension>
    </complexContent>
</xsd:complexType>
<!-- .................. Impact Type ................................. -->
<xsd:simpleType name="ImpactType">
    <xsd:restriction base="xsd:NMTOKEN">
        <xsd:enumeration value="NONE"/>
        <xsd enumeration value="CREATE"/>
        <xsd enumeration value="DELETE"/>
        <xsd enumeration value="UPDATE"/>
        <xsd enumeration value="UNKNOWN"/>
    </xsd:restriction>
</xsd:simpleType>
<!-- .................. LIA Type .................................. -->
<xsd:simpleType name="LIAType">
    <xsd:restriction base="xsd:NMTOKEN">
        <xsd:enumeration value="lineage"/>
        <xsd:enumeration value="impact"/>
    </xsd:restriction<
</xsd:simpleType>
<!-- ..................Parent Type ................................. -->
<xsd:complexType name="ParentType">
    <complexContent>
        <extension base="ObjectReferencetype"/>
    </complexContent>
</xsd:complexType>
<!-- .................. ConnectorList Type .......................... -->
<xsd:complexType name="ConnectorListType">
    <xsd:sequence minOccurs="1" maxOccurs="unbounded">
        <xsd:element name="CONNECTOR" type=
        "ConnectorType"/>
    </xsd:sequence>
</xsd:complexType>
<!-- .................. Connector Type ............................... -- >
<xsd:complexType name="ConnectorType">
    <xsd:sequence minOccurs="1" maxOccurs="1">
        <xsd:element name="FROM" type="FromType"/>
        <xsd:element name="TO" type="ToType"/>
    </xsd:sequence>
</xsd:complexType>
<!-- .................. Connector Base ............................. -->
<xsd:complexType name="ConnectorBaseReference">
    <xsd:sequence>
        <xsd:attribute name="ID" type="xsd:ID" use="required"/>
        <xsd:attribute name="NAME" type="xsd:string" use=
        "required"/>
        <xsd:attribute name="TYPE" type="xsd:string" use=
        "required"/>
    </xsd:sequence>
</xsd:complexType>
<!-- .................. From Type ...................... -->
<xsd:complexType name="FromType">
    <complexContent>
        <extension base="ConnectorBaseReference"/>
    </complexContent>
</xsd:complexType>
<!-- ................. To Type ..........................-->
<xsd:complexType name="ToType">
    <complexContent>
        <extension base="ConnectorBaseReference"/>
    </complexContent>
</xsd:complexType>
</xsd:schema>
```

APPENDIX B

```
<?xml version="1.0" encoding="UTF-8" ?>
<TREE xmlns:xsi="http://www.w3.org/2000/10/XMLSchema-instance"
      xsi:noNamespaceSchemaLocation="lia.xsd" CreateDate="" UpdateDate="24-OCT-
      02" Description="unknown" LIAType="impact">                                               30A
    <DEPENDENCY Impact="NONE" Description="NONE" Complete="YES">
        <OBJECT>
            <NAME>ORACLE_CATEGORIES</NAME>                                                       31A
            <TYPE>TABLE</TYPE>
            <ID>13578</ID>
                <DESCRIPTION>ORACLE_ORDER_SYSTEM.ORACLE_CATEGORIES</DE
                SCRIPTION>
            <PARENT>
                <NAME>ORACLE_ORDER_SYSTEM</NAME>
                <TYPE>PACKAGED_MODULE</TYPE>
```

APPENDIX B-continued

```
            <ID>13567</ID>
                <DESCRIPTION>DRUGDEPO_WH.ORACLE_ORDER_SYSTEM</DESCRI
                PTION>
        </PARENT>
    <DEPENDENCY Impact="NONE" Description="NONE" Complete="YES">
        <OBJECT>
            <NAME>ORACLE_CATEGORIES</NAME>
            <TYPE>TABLE</TYPE>
            <ID>13578</ID>
                <DESCRIPTION>ORACLE_ORDER_SYSTEM.ORACLE_CATEGORIES<
                /DESCRIPTION>
            <PARENT>
                <NAME>ORACLE_ORDER_SYSTEM</NAME>
                <TYPE>PACKAGED_MODULE</TYPE>
                <ID>13567</ID>
                    <DESCRIPTION>DRUGDEPO_WH.ORACLE_ORDER_SYSTEM</DE
                    SCRIPTION>
            </PARENT>
            <DEPENDENCY Impact="NONE" Description="NONE" Complete="NO" />
        </OBJECT>
    </DEPENDENCY>
    <DEPENDENCY Impact="NONE" Description="NONE" Complete="YES">
        <OBJECT>
            <NAME>UNION_1</NAME>                                                33A
            <TYPE>SetOperation</TYPE>
            <ID>14972</ID>
            <DESCRIPTION>MAP_PRODUCTS.UNION_1</DESCRIPTION>
            <PARENT>
                <NAME>MAP_PRODUCTS</NAME>                                       33B
                <TYPE>TRANSFORM_MAP</TYPE>
                <ID>14971</ID>
                <DESCRIPTION>DRUGDEPO_WH.MAP_PRODUCTS</DESCRIPTION>
            </PARENT>
            <DEPENDENCY Impact="NONE" Description="NONE" Complete="YES"
                />
        <DEPENDENCY Impact="NONE" Description="NONE" Complete="YES">
            <OBJECT>
                <NAME>PRODUCTS</NAME>                                           34A
                <TYPE>DIMENSION</TYPE>
                <ID>13405</ID>
                <DESCRIPTION>DRUGWAREHOUSE.PRODUCTS</DESCRIPTION>
                <PARENT>
                    <NAME>DRUGWAREHOUSE</NAME>                                  37A
                    <TYPE>DATAWAREHOUSE </TYPE>
                    <ID>13119</ID>
                        <DESCRIPTION>DRUGDEPO_WH.DRUGWAREHOUSE</DESC
                        RIPTION>
                </PARENT>
                <DEPENDENCY Impact="NONE" Description="NONE"
                    Complete="YES" />                                           37C
                <DEPENDENCY Impact="NONE" Description="NONE"
                    Complete="YES">
                        <OBJECT>
                            <NAME>SALES</NAME>
                            <TYPE>CUBE</TYPE>
                            <ID>16535</ID>
                            <DESCRIPTION>DRUGWAREHOUSE.SALES</DESCR
                            IPTION>
                            <PARENT>
                                NAME>DRUG WAREHOUSE</NAME>
                                <TYPE>DATAWAREHOUSE</TYPE>
                                <ID>16122</ID>
                                <DESCRIPTION>DRUGDEPO_WH.DRUGWARE
                                HOUSE</DESCRIPTION>
                            </PARENT>
                            <DEPENDENCY Impact="NONE" Description="NONE"
                            Complete="YES"/>
                        </OBJECT>
                </DEPENDENCY>
            </OBJECT>
        </DEPENDECY>
    <DEPENDENCY Impact="NONE" Description="NONE" Complete="YES">
        <OBJECT>
            <NAME>EXPR</NAME>                                                   35A
            <TYPE>ExpressionTransform</TYPE>
            <ID>15149</ID>
            <DESCRIPTION>MAP_PRODUCTS.EXPR</DESCRIPTION>
            <PARENT>
                <NAME>MAP_PRODUCTS</NAME>
```

APPENDIX B-continued

```
                <TYPE>TRANSFORM_MAP</TYPE>
                <ID>14971</ID>
                    <DESCRIPTION >DRUGDEPO_WH.MAP_PRODUCTS</DESCRI
                    PTION>
            </PARENT>
            <DEPENDENCY Impact="NONE" Description="NONE"
                Complete="YES" />
          - <DEPENDENCY Impact="NONE" Description="NONE"
                Complete="YES">
              - <OBJECT>
                    <NAME>PRODUCTS</NAME>                                       38A
                    <TYPE>DIMENSION </TYPE>
                    <ID>13405</ID>
                        <DESCRIPTION >DRUGWAREHOUSE.PRODUCTS</DESCRIP
                        TION>
                  - <PARENT>
                        <NAME>DRUGWAREHOUSE</NAME>
                        <TYPE>DATAWAREHOUSE</TYPE>
                        <ID>13119</ID>
                            <DESCRIPTION>DRUGDEPO_WH.DRUGWAREHOUSE</
                            DESCRIPTION>
                    </PARENT>
                    <DEPENDENCY Impact="NONE" Description="NONE"
                        Complete="NO" />                                        38C
                </OBJECT>
            </DEPENDENCY>
        </OBJECT>
      </DEPENDENCY>
    </OBJECT>
  </DEPENDENCY>
</TREE>
```

APPENDIX C

```
<?xml version="1.0" encoding="UTF-8" ?>
- <TREE xmlns:xsi="http://www.w3.org/2000/10/XMLSchema-instance"
        xsi:noNamespaceSchemaLocation="lia.xsd" CreateDate="" UpdateDate="24-OCT-
        02" Description="unknown" LIAType="lineage">                           30A
  - <DEPENDENCY Impact="NONE" Description="NONE" Complete="YES">
    - <OBJECT>
          <NAME>GEOGRAPHIES</NAME>
          <TYPE>DIMENSION</TYPE>
          <ID>13483</ID>
          <DESCRIPTION>DRUGWAREHOUSE.GEOGRAPHIES</DESCRIPTION>
        - <PARENT>
              <NAME>DRUGWAREHOUSE</NAME>
              <TYPE>DATAWAREHOUSE</TYPE>
              <ID>13119</ID>
              <DESCRIPTION>DRUGDEPO_WH.DRUGWAREHOUSE</DESCRIPTION>
          </PARENT>
        - <DEPENDENCY Impact="NONE" Description="NONE" Complete="YES">
            - <OBJECT>
                  <NAME>COUNTRY_LK</NAME>
                  <TYPE >TABLE</TYPE>
                  <ID>13189</ID>
                  <DESCRIPTION>DRUGWAREHOUSE.COUNTRY_LK</DESCRIPTION>
                - <PARENT>
                      <NAME>DRUGWAREHOUSE</NAME>
                      <TYPE>DATAWAREHOUSE</TYPE>
                      <ID>13119</ID>
                        <DESCRIPTION>DRUGDEPO_WH.DRUGWAREHOUSE</DESCRIPTI
                        ON>
                  </PARENT>
                  <DEPENDENCY Impact="NONE" Description="NONE" Complete="YES">
                    />
                - DEPENDENCY Impact="NONE" Description="NONE" Complete="YES">
                    - <OBJECT>
                          <NAME>COUNTRYLK_TXT</NAME>
                          <TYPE>FILE</TYPE>
                          <ID>13109</ID>
                            <DESCRIPTION >SOURCEFILES.COUNTRYLK_TXT</DESCRIPTIO
                            N>
                        - <PARENT>
                              <NAME>SOURCEFILES</NAME>
```

APPENDIX C-continued

```xml
                <TYPE>FILE_MODULE</TYPE>
                <ID>13102</ID>
                    <DESCRIPTION>DRUGDEPO_WH.SOURCEFILES</DESCRIPTION>
            </PARENT>
            <DEPENDENCY Impact="NONE" Description="NONE"
                Complete="YES" />
        </OBJECT>
    </DEPENDENCY>
    -<DEPENDENCY Impact="NONE" Description="NONE" Complete="YES">
        -<OBJECT>
            <NAME>CUSTOMERS</NAME>
            <TYPE>TABLE<TYPE>
            <ID>13618</ID>
                <DESCRIPTION>ORACLE_ORDER_SYSTEM.CUSTOMERS</DESCRIPTION>
            -<PARENT>
                <NAME>ORACLE_ORDER_SYSTEM</NAME>
                <TYPE>PACKAGED_MODULE</TYPE>
                <ID>13567</ID>
                    <DESCRIPTION>DRUGDEPO_WH.ORACLE_ORDER_SYSTEM</DESCRIPTION>
            </PARENT>
            <DEPENDENCY Impact="NONE" Description="NONE"
                Complete="YES"/>
        </OBJECT>
    </DEPENDENCY>
</OBJECT>
</DEPENDENCY
-<DEPENDENCY Impact="NONE" Description="NONE" Complete="YES">
    -<OBJECT>
        <NAME>SALES_REGIONS</NAME>
        <TYPE >TABLE</TYPE>
        <ID>13568</ID>
            <DESCRIPTION>ORACLE_ORDER_SYSTEM.SALES_REGIONS</DESCRIPTION>
        -<PARENT>
            <NAME>ORACLE_ORDER_SYSTEM</NAME>
            <TYPE>PACKAGED_MODULE</TYPE>
            <ID>13567</ID>
                <DESCRIPTION>DRUGDEPO_WH.ORACLE_ORDER_SYSTEM</DESCRIPTION>
        <PARENT>
        <DEPENDENCY Impact="NONE" Description="NONE" Complete="YES"
            />
        -<DEPENDENCY Impact="NONE" Description="NONE" Complete="YES">
            -<OBJECT>
                <NAME>CUSTOMERS</NAME>
                <TYPE>TABLE</TYPE>
                <ID>13618</ID>
                    <DESCRIPTION>ORACLE_ORDER_SYSTEM.CUSTOMERS</DESCRIPTION>
                -<PARENT>
                    <NAME>ORACLE_ORDER_SYSTEM</NAME>
                    <TYPE>PACKAGED_MODULE</TYPE>
                    <ID>13567</ID>
                        <DESCRIPTION>DRUGDEPO_WH.ORACLE_ORDER_SYSTEM</DESCRIPTION>
                </PARENT>
                <DEPENDENCY Impact="NONE" Description="NONE"
                    Complete="NO" />
            </OBJECT>
        </DEPENDENCY>
    </OBJECT>
</DEPENDENCY>
-<DEPENDENCY Impact="NONE" Description="NONE" Complete="YES">
    -<OBJECT>
        <NAME>STATE_TAX</NAME>
        <TYPE>TABLE</TYPE>
        <ID>13573</ID>
            <DESCRIPTION>ORACLE_ORDER_SYSTEM.STATE_TAX</DESCRIPTION>
        -<PARENT>
            <NAME>ORACLE_ORDER_SYSTEM</NAME>
            <TYPE>PACKAGED_MODULE</TYPE>
            <ID>13567</ID>
                <DESCRIPTION>DRUGDEPO_WH.ORACLE_ORDER_SYSTEM</DESCRIPTION>
        </PARENT>
```

APPENDIX C-continued

```
            <DEPENDENCY Impact="NONE" Description="NONE" Complete="YES"
                />
        - <DEPENDENCY Impact="NONE" Description="NONE" Complete="YES">
            - <OBJECT>
                    <NAME>CUSTOMERS</NAME>
                    <TYPE >TABLE</TYPE>
                    <ID>13618</ID>
                        <DESCRIPTION>ORACLE_ORDER_SYSTEM.CUSTOMERS</DES
                        CRIPTION>
                - <PARENT>
                        <NAME>ORACLE_ORDER_SYSTEM</NAME>
                        <TYPE>PACKAGED_MODULE</TYPE>
                        <ID>13567</ID>
                            <DESCRIPTION >DRUGDEPO_WH.ORACLE_ORDER_SYSTEM
                            </DESCRIPTION>
                    </PARENT>
                    <DEPENDENCY Impact="NONE" Description="NONE"
                        Complete="NO" />
                </OBJECT>
            </DEPENDENCY>
        </OBJECT>
    </DEPENDENCY>
    - <DEPENDENCY Impact="NONE" Description="NONE" Complete="YES">
        - <OBJECT>
                <NAME>CUSTOMERS</NAME>
                <TYPE>TABLE<TYPE>
                <ID>13618</ID>
                    <DESCRIPTION>ORACLE_ORDER_SYSTEM.CUSTOMERS</DESCRIP
                    TION>
            - <PARENT>
                    <NAME>ORACLE_ORDER_SYSTEM</NAME>
                    <TYPE>PACKAGED_MODULE</TYPE>
                    <ID>13567</ID>
                        <DESCRIPTION>DRUGDEPO_WH.ORACLE_ORDER_SYSTEM</DE
                        SCRIPTION>
                </PARENT>
                <DEPENDENCY Impact="NONE" Description="NONE" Complete="NO" />
            </OBJECT>
        </DEPENDENCY>
    </OBJECT>
</DEPENDENCY>
<TREE>
```

What is claimed is:

1. A method of analyzing dependencies between objects, the method comprising the computer-implemented steps of:
   determining a first set of dependencies between a first plurality of objects based on data from a first set of sources;
   determining a second set of dependencies between a second plurality of objects based on data from a second set of sources;
   wherein the first set of sources comprise different types of sources than the second set of sources;
   storing, in a computer-readable storage medium, in a common dependency format, first data that reflects the first set of dependencies; and
   storing, in said computer-readable storage medium, in said common dependency format, second data that reflects the second set of dependencies.

2. The method of claim 1 wherein the first set of sources includes a first type of database server, and the second set of sources includes a second type of database server that differs from the first type of database server.

3. The method of claim 1 wherein the first set of sources includes a database server, and the second set of sources does not include a database server.

4. The method of claim 1, wherein:
   the dependencies in the first set of dependencies are determined based on a first set of rules;
   the dependencies in the second set of dependencies are determined based on a second set of rules that are different from said first set of rules;
   the first set of rules indicates that a first object depends from a second object if the first object has a first type of relationship with the second object;
   the second set of rules indicates that the first object depends from the second object if the first object has a second type of relationship with the second object; and
   the first object has one of the first type and the second type of relationship with the second object without the first object having the other one of the first type and the second type of relationship with the second object.

5. A method of analyzing dependencies between objects, the method comprising the computer-implemented steps of:
   determining a first set of dependencies between a first plurality of objects based on a first set of one or more dependency rules;
   determining a second set of dependencies between a second plurality of objects based on a second set of one or more dependency rules;
   wherein the first set of dependency rules define dependency in a different way than the second set of dependency rules;
   storing, in a computer-readable storage medium, in a common dependency format, first data that reflects the first set of dependencies; and storing, in said computer-readable storage medium, in said common dependency format, second data that reflects the second set of dependencies.

6. The method of claim 5, further comprising the step of storing, in a single repository, information that represents the first set of dependencies and information that represents the second set of dependencies.

7. The method of claim 5, wherein:
the step of storing first data includes generating a first document that conforms to said common dependency format; and
the step of storing second data includes generating a second document that conforms to said common dependency format.

8. The method of claim 7, further comprising the steps of:
reading, with a computer program, the first document;
generating, based on said first document, visual representations of the first set of dependencies, wherein the visual representations of the first set of dependencies are separate from the first document;
reading, with said computer program, the second document; and
generating, based on said second document, visual representations of the second set of dependencies, wherein the visual representations of the second set of dependencies are separate from the second document.

9. The method of claim 7, wherein the first and second documents are XML documents and the common dependency format is defined by an XML schema, wherein the XML schema defines at least a first tag type for general objects, a second tag type for parent objects, and a third tag type for dependent objects, wherein the first tag type, the second tag type, and the third tag type differ from each other.

10. The method of claim 9, wherein further comprising using an XSL transformation program to process both said first document and said second document.

11. The method of claim 5, wherein the common dependency format includes constructs to reflect a hierarchy of the dependencies between the plurality of objects, and wherein:
the step of storing the first data further comprises the step of storing the first data in a hierarchical format; and
the step of storing the second data comprises the step of storing the second data in the hierarchical format.

12. The method of claim 5, wherein:
the first plurality of objects includes a particular object that depends on itself; and
the step of storing the first data further comprises the step of associating a tag with all occurrences of the particular object other than a particular occurrence of the object, wherein the tag references the particular occurrence of the particular object.

13. The method of claim 5, wherein objects that belong to the first plurality of objects are different types of objects than objects that belong to the second plurality of objects.

14. The method of claim 5, wherein the objects in the first plurality of objects are installable software components, and the first set of dependencies reflect the sequence in which the installable software components need to be installed.

15. The method of claim 5, wherein a data item is associated with a particular object of the first plurality of objects, and wherein the step of determining the first set of dependencies includes the step of determining which other objects in the first plurality of objects are affected when the value of the data item is modified.

16. The method of claim 5, further comprising the step of using the first set of dependency rules to determine what other objects in the first plurality of objects are affected when the structure of a particular object is modified.

17. The method of claim 5, further comprising the step of using the first set of dependency rules to determine what objects in the first plurality of objects are affected by changes associated with other objects of said first plurality of objects.

18. A method of analyzing dependencies between objects, the method comprising the computer-implemented steps of:
determining a first set of dependencies between a first plurality of objects based on a first set of one or more dependency rules, and
data, from a first set of sources, about the first plurality of objects;
determining a second set of dependencies between a second plurality of objects based on
a second set of one or more dependency rules, and
data, from a second set of sources, about the second plurality of objects;
wherein the first set of dependency rules define dependency in a different way than the second set of dependency rules;
wherein objects in said first plurality of objects are different types of object than said second plurality of objects;
wherein the first set of sources are different than said second set of sources;
storing, in a computer-readable storage medium, in a common dependency format, first data that reflects the first set of dependencies; and
storing, in said computer-readable storage medium, in said common dependency format, second data that reflects the second set of dependencies;
whereby data that indicates both dependencies between the first set of objects and dependencies between second set of objects becomes usable to software programs that support said common dependency format.

19. A computer-readable storage medium carrying one or more sequences of instructions, which when executed by one or more processors, cause the one or more processors to perform the method of any one of claims 1-18, wherein the computer-readable storage medium is one of a volatile medium or a non-volatile medium.

* * * * *

UNITED STATES PATENT AND TRADEMARK OFFICE
CERTIFICATE OF CORRECTION

| | | |
|---|---|---|
| PATENT NO. | : 7,680,818 B1 | Page 1 of 1 |
| APPLICATION NO. | : 10/325784 | |
| DATED | : March 16, 2010 | |
| INVENTOR(S) | : Zili Fan et al. | |

It is certified that error appears in the above-identified patent and that said Letters Patent is hereby corrected as shown below:

On the title page, item (56), under "Other Publications", in column 2, line 1, delete "BusinessObjects" and insert -- Business Objects --, therefor.

On the title page, item (56), under "Other Publications", in column 2, line 2, delete "BusinessObjects" and insert -- Business Objects --, therefor.

On Page 2, in column 2, under "Other Publications", line 19, delete "theroy" and insert -- theory --, therefor.

On Page 2, in column 2, under "Other Publications", line 23, delete "delevelopment" and insert -- development --, therefor.

In column 3, line 51, after "designed" insert -- context-specific --.

In column 14, line 5, delete "<xsd" and insert -- <xsd: --, therefor.

In column 14, line 6, delete "<xsd" and insert -- <xsd: --, therefor.

In column 14, line 7, delete "<xsd" and insert -- <xsd: --, therefor.

In column 14, line 8, delete "<xsd" and insert -- <xsd: --, therefor.

Signed and Sealed this

Twenty-first Day of September, 2010

David J. Kappos
*Director of the United States Patent and Trademark Office*